United States Patent
Kim et al.

(10) Patent No.: US 7,801,209 B2
(45) Date of Patent: Sep. 21, 2010

(54) VARIABLE TAP LENGTH EQUALIZERS AND RELATED DIGITAL RECEIVERS, METHODS AND COMPUTER PROGRAM PRODUCTS

(75) Inventors: Do-Han Kim, Gyeonggi-do (KR); Hyun-Bae Jeon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1036 days.

(21) Appl. No.: 11/487,226

(22) Filed: Jul. 14, 2006

(65) Prior Publication Data

US 2008/0013618 A1    Jan. 17, 2008

(51) Int. Cl.
*H03H 7/30*    (2006.01)
(52) U.S. Cl. ................ 375/230; 375/229; 375/232; 375/233; 375/350; 708/323; 708/322; 333/18
(58) Field of Classification Search ............... 375/229, 375/230, 232, 233, 350; 708/323, 322; 333/18
See application file for complete search history.

(56) References Cited

U.S. PATENT DOCUMENTS 6,327,302 B1 * 12/2001 Shen ................... 375/232

2002/0012391 A1 * 1/2002 Ahn ..................... 375/232
2002/0150155 A1 * 10/2002 Florentin et al. ........... 375/233
2002/0181575 A1    12/2002 Birru

FOREIGN PATENT DOCUMENTS

| EP | 1 033 851 A2 | 9/2000 |
|---|---|---|
| JP | 2005-135563 | 5/2005 |
| KR | 2004-0038181 A | 5/2004 |

* cited by examiner

*Primary Examiner*—David C Payne
*Assistant Examiner*—Zewdu Kassa
(74) *Attorney, Agent, or Firm*—Myers Bigel Sibley & Sajovec

(57) ABSTRACT

Equalizers are provided including an N-tap feed forward filter, an M-tap feed backward filter, an L-tap filter, a control unit and an accumulator. The control unit is configured to connect the L-tap filter to the N-tap feed forward filter or the M-tap feed backward filter based on multipath information present in a communications channel. The accumulator is configured to sum output signals from at least one of the N-tap feed forward filter, the M-tap feed backward filter and the L-tap filter and to output a summation result. Related digital receivers, methods and computer program products are also provided.

10 Claims, 8 Drawing Sheets

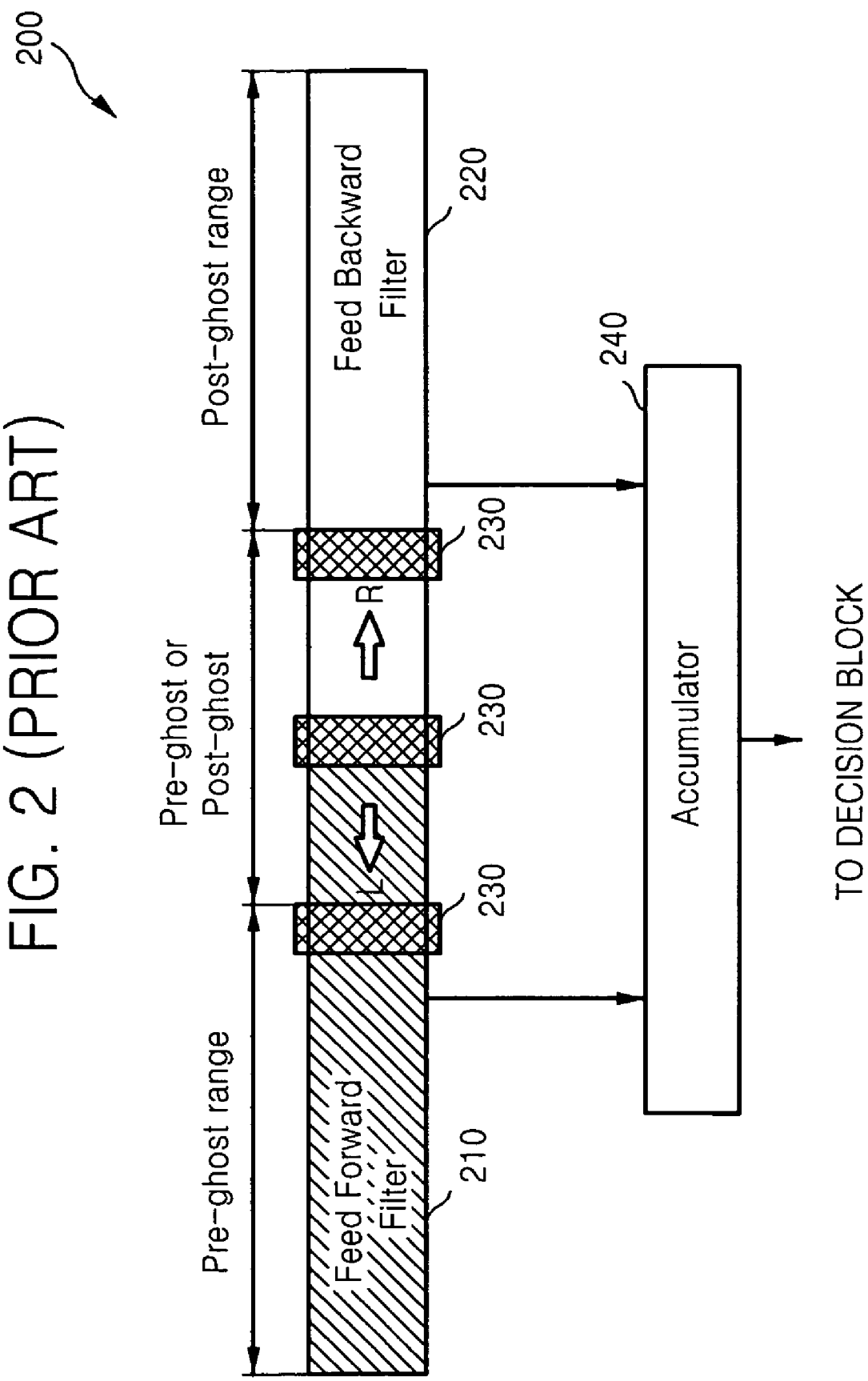

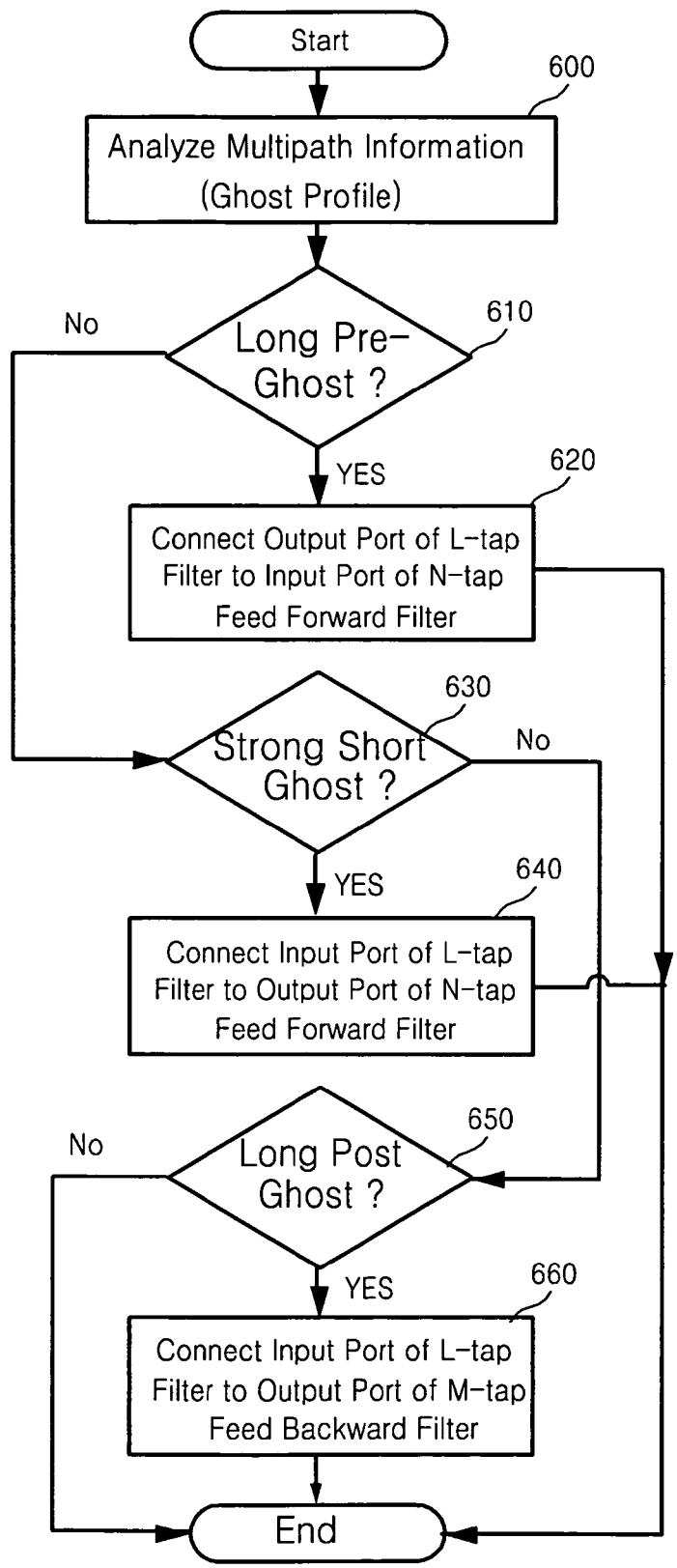

VARIABLE TAP LENGTH EQUALIZERS AND RELATED DIGITAL RECEIVERS, METHODS AND COMPUTER PROGRAM PRODUCTS

FIELD OF THE INVENTION

The present invention relates to communications, and more particularly, to equalizers and methods of operating the same.

BACKGROUND OF THE INVENTION

In the field of communication, multipath is a propagation phenomenon that results in radio signals reaching a receiver (receiving antenna) by two or more paths, thus, the same radio signals may arrive multiple times at the receiver at slightly different times, which may cause signal distortion. Multipath or multipath information may be caused by, for example, atmospheric ducting, ionospheric reflection and refraction, and/or reflection from terrestrial objects, such as mountains and buildings. Because there can be only one "direct" path, some process of reflection, refraction, or scattering must account for multipath information. Furthermore, multipath information may result in a form of echoing or one or more "ghost signals."

Accordingly, equalizers are widely used to compensate for channel distortion, for example, multipath information, in signal transmitting and receiving systems used in the fields of communications, broadcasting, storage media, the military and the like. To effectively remove multipath information having a time delay with respect to a main signal, equalizers typically have a sufficient tap length, i.e., a sufficient number of taps, to handle multipath information. To remove multipath information from a signal, an equalizer typically includes an N-tap feed forward filter and an M-tap feed backward filter, which may reduce the ghost signals present before (pre-ghost signal) and after (post-ghost signal) the main signal.

Referring now to FIG. 1, a schematic block diagram illustrating conventional fixed tap length equalizers 100 will be discussed. As illustrated in FIG. 1, the fixed tap length equalizer 100 includes a feed forward filter 110 including a main tap 130, a feed backward filter 120, and an accumulator 140. The tap length (number of taps) in the feed forward filter 110 and the tap length in the feed backward filter 120 are fixed.

Based on the main tap 130, a pre-ghost signal is removed by the feed forward filter 110 and a post-ghost signal is removed by the feed backward filter 120. A ghost signal that exists in a short section behind the main tap 130 (or a main signal) and has a large magnitude ("strong short ghost signal") may be removed by some of the taps of the feed forward filter 110, which are located behind the main tap 130 and/or some of the taps of the feed backward filter 120. Typically, a long pre-ghost signal and a long post-ghost signal, which have an enough magnitude to influence a main signal, do not exist simultaneously.

The accumulator 140 receives output signals of the feed forward filter 110 and output signals of the feed backward filter 120, sums the received output signals and outputs a summation result to a decision block (not shown).

Conventional fixed tap length equalizers 100 typically have enough tap length to cover most possible lengths of ghost signals and, therefore, typically use a lot of hardware. Conventional fixed tap length equalizer 100 may also be able to handle multipath information (or a ghost signal profile) that rapidly changes. However, when the amount of the change goes beyond the limit of conventional fixed tap length equalizers 100, coefficients of all taps included in the conventional fixed tap length equalizer 100 may be initialized.

Referring now to FIG. 2, a schematic block diagram of conventional main tap moving equalizers 200 will be discussed. As illustrated in FIG. 2, the conventional main tap moving equalizer 200 includes a feed forward filter 210 including a main tap 230, a feed backward filter 220, and an accumulator 240. The tap length of the feed forward filter 210 is the same as the tap length of the feed backward filter 220. The main tap 230 is moved based on multipath information so that a ghost signal may be removed.

For example, when a long pre-ghost signal exists in a channel, the conventional main tap moving equalizer 200 may be configured to move the main tap 230 to the right (R) to increase a pre-ghost signal handling range. Similarly, when a long post-ghost signal exists in a channel, the conventional main tap moving equalizer 200 may be configured to move the main tap 230 to the left (L) to increase a post-ghost signal handling range. Accordingly, the conventional main tap moving equalizer 200 typically has a very wide ghost signal handling range.

However, the conventional main tap moving equalizer 200 may not remove strong short ghost signals existing behind the main tap 230 effectively. Moreover, since a data bit width of a tap of the feed backward filter 220, which is smaller than a tap of the feed forward filter 210, is increased, the size of the hardware for the conventional main tap moving equalizer 200 may also be increased. Furthermore, when multipath information changes, the main tap 230 is moved, and therefore, coefficients of all taps included in the conventional main tap moving equalizer 200 may be initialized.

SUMMARY OF THE INVENTION

Some embodiments of the present invention provide equalizers including an N-tap feed forward filter, an M-tap feed backward filter, an L-tap filter, a control unit and an accumulator. The control unit is configured to connect the L-tap filter to the N-tap feed forward filter or the M-tap feed backward filter based on multipath information present in a communications channel. The accumulator is configured to sum output signals from at least one of the N-tap feed forward filter, the M-tap feed backward filter and the L-tap filter and to output a summation result.

In further embodiments of the present invention, the control unit may be configured to connect an output port of the L-tap filter to an input port of the N-tap feed forward filter, connect an input port of the L-tap filter to an output port of the N-tap feed forward filter, or connect the input port of the L-tap filter to an output port of the M-tap feed backward filter based on the multipath information present in the communications channel.

In still further embodiments of the present invention, the control unit may be further configured to connect the output port of the L-tap filter to the input port of the N-tap feed forward filter when the multipath information is a long pre-ghost signal, connect the input port of the L-tap filter to the output port of the N-tap feed forward filter when the multipath information is a strong short ghost signal, or connect the input port of the L-tap filter to the output port of the M-tap feed backward filter when the multipath information is a long post-ghost signal.

In some embodiments of the present invention, the control unit may include a controller and first and second selectors. The controller may be configured to generate a first selection signal, a second selection signal, and a control signal based on the multipath information present in the communications channel. The first selector may be configured to selectively output an input signal or an output signal of the L-tap filter to the N-tap feed forward filter responsive to the first selection signal. The second selector may be configured to selectively output the input signal, an output signal of the N-tap feed forward filter or an output signal of the M-tap feed backward filter to the L-tap filter responsive to the second selection signal.

In further embodiments of the present invention, the control signal may be used to turn on or off the L-tap filter, to reset the L-tap filter, or to synchronize the output signal of the L-tap filter with the output signal of the N-tap feed forward filter and the output signal of the M-tap feed backward filter.

Although embodiments of the present invention are discussed above primarily with respect to equalizers, related digital receivers, methods and computer program products are also provided herein.

BRIEF DESCRIPTION OF THE DRAWINGS

FIG. 2 is a schematic block diagram illustrating a conventional main tap moving equalizer.

FIG. 6 is a flowchart illustrating steps for removing various ghost signals using a variable tap length equalizer according to some embodiments of the present invention.

DETAILED DESCRIPTION OF THE INVENTION

Figure 1:
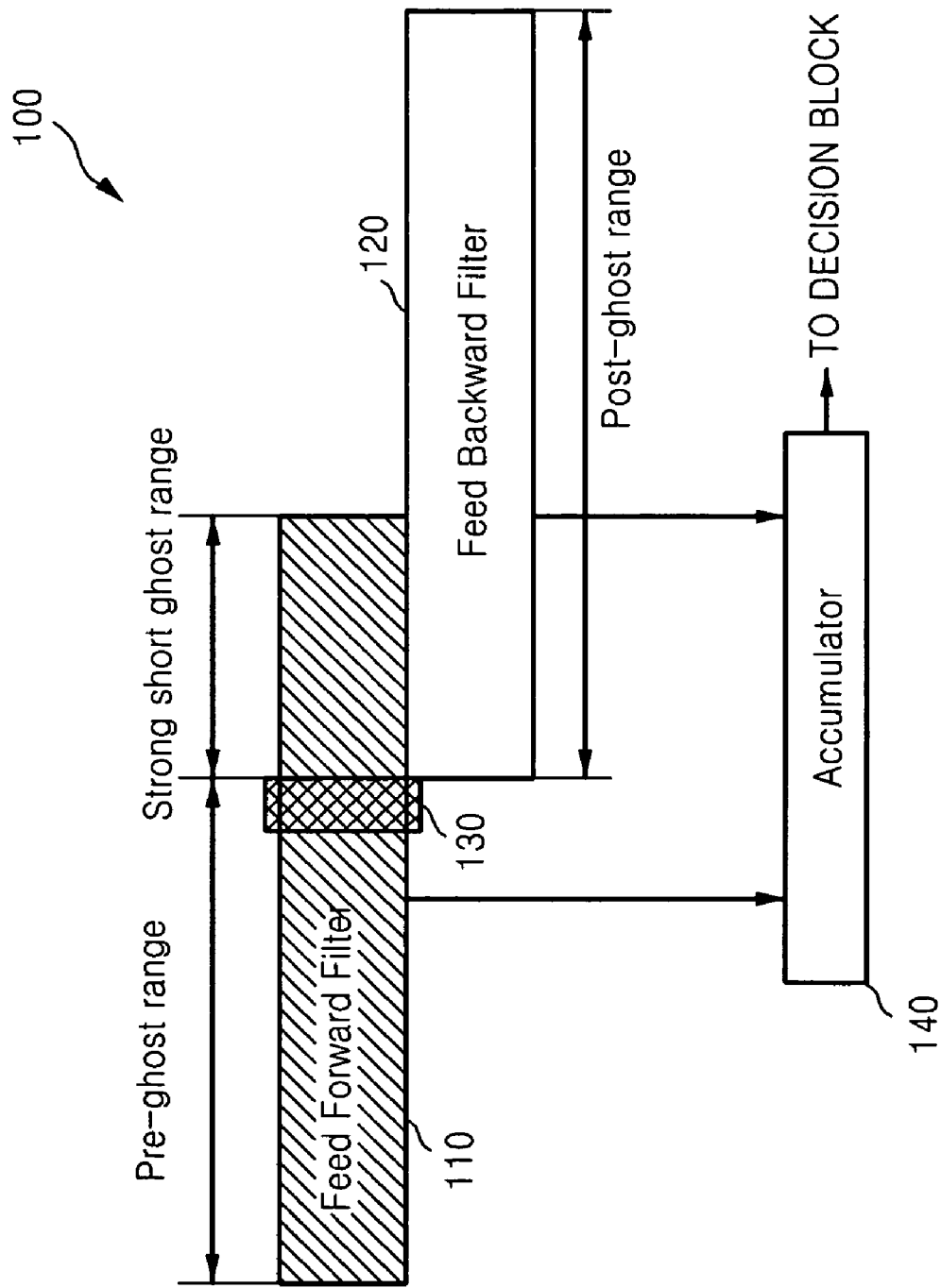
FIG. 1 is a schematic block diagram illustrating a conventional fixed tap length equalizer.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Like numbers refer to like elements throughout.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as equalizers, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of equalizers, methods and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 3A:
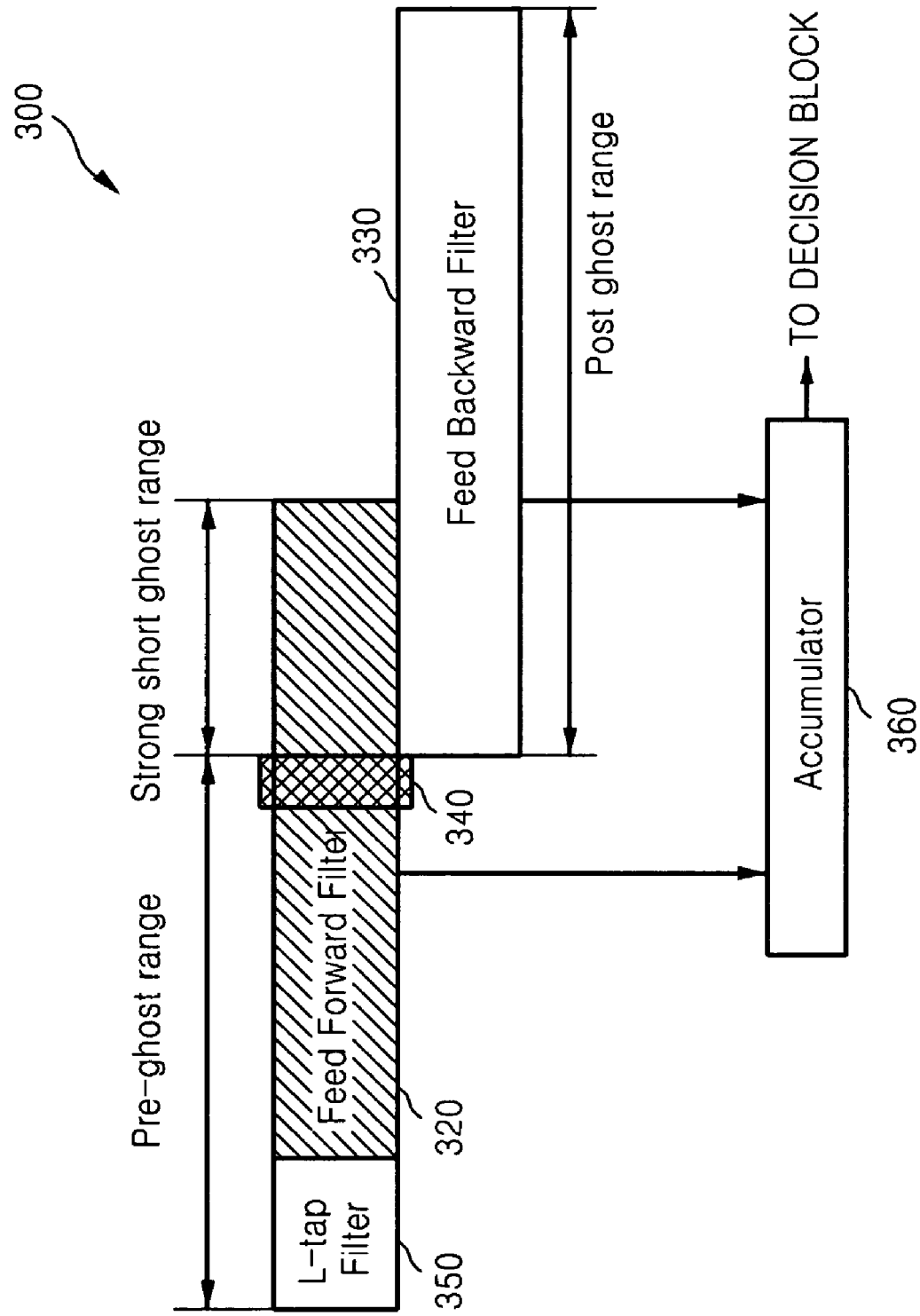
FIG. 3A is a schematic block diagram illustrating variable tap length equalizers for removing a long pre-ghost signal according to some embodiments of the present invention.

Referring first to FIG. 3A, a schematic block diagram illustrating variable tap length equalizers 300 for removing a long pre-ghost signal according to some embodiments of the present invention will be discussed. As used herein, "long pre-ghost signal" and "long post-ghost signal" refer to ghost signals that have enough magnitude to influence a main signal. As illustrated in FIG. 3A, variable tap length equalizer 300 according to some embodiments of the present invention include a feed forward filter 320 including a main tap 340, a feed backward filter 330, an L-tap filter 350, and an accumulator 360. The main tap 340 is a tap that has the greatest coefficient of the taps included in the variable tap length equalizer 300.

Based on the main tap 340, a pre-ghost signal in a channel may be removed using the feed forward filter 320 and a post-ghost signal in a channel may be removed using the feed backward filter 330. A strong short ghost signal that may exist behind the main tap 340 may be removed using some taps of the feed forward filter 320, which are located behind the main tap 340, and some taps of the feed backward filter 330.

When a long pre-ghost signal exists, the variable tap length equalizer 300 is configured to connect an output port of the L-tap filter 350 to an input port of the feed forward filter 320 to increase the tap length of the feed forward filter 320, thus extending a long pre-ghost signal handling range. In other words, the long pre-ghost signal can be removed by the L-tap filter 350 and the feed forward filter 320 that are connected in series. The accumulator 350 receives output signals of the feed forward filter 320 and output signals of the feed backward filter 330, sums the output signals, and outputs a summation result to a decision block (not shown).

Figure 3B:
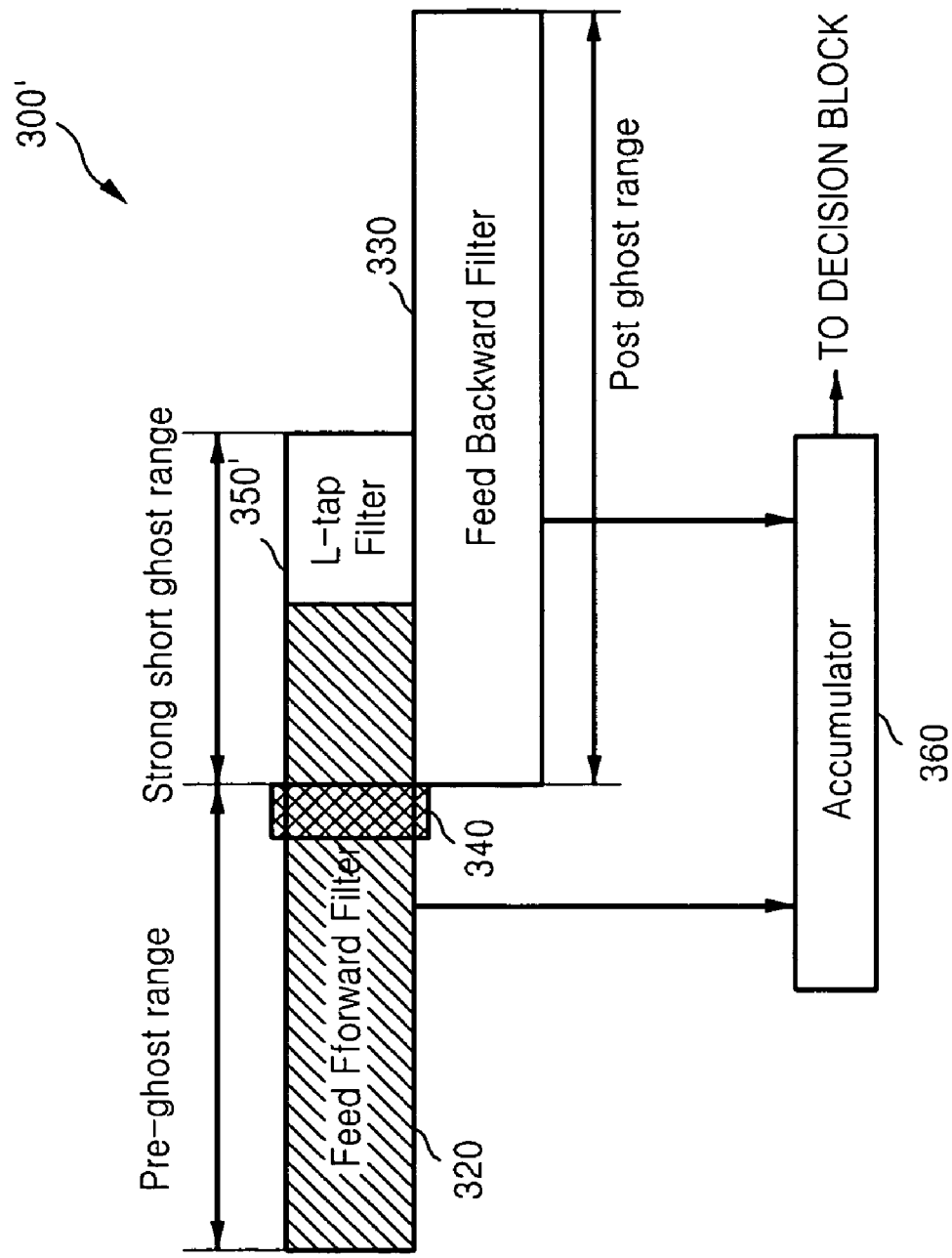
FIG. 3B is a schematic block diagram illustrating variable tap length equalizers for removing a strong short ghost signal in a short section behind a main tap according to some embodiments of the present invention.

Referring now to FIG. 3B, a schematic block diagram of the variable tap length equalizer 300' for removing a strong short ghost signal in a short section behind a main tap according to some embodiments of the present invention will be discussed. The variable tap length equalizer 300' includes the feed forward filter 320 including the main tap 340, the feed backward filter 330, the L-tap filter 350', and the accumulator 360. The functionality of like numbered elements of FIGS. 3A and 3B are similar and, therefore, the details will not be repeated herein. However, as illustrated in FIGS. 3A and 3B, the positioning of L-tap filter 350' of FIG. 3B is different from the L-tap filter 350 of FIG. 3A and, therefore, will be discussed.

When a strong short ghost signal exists in a channel, the variable tap length equalizer 300' is configured to connect an output port of the feed forward filter 320 to an input port of the L-tap filter 350' to increase the tap length of the feed forward filter 320, thus extending a strong short ghost signal handling range. In other words, the strong short ghost signal can be removed by the feed forward filter 320 and the L-tap filter 350' that are connected in series.

Figure 3C:
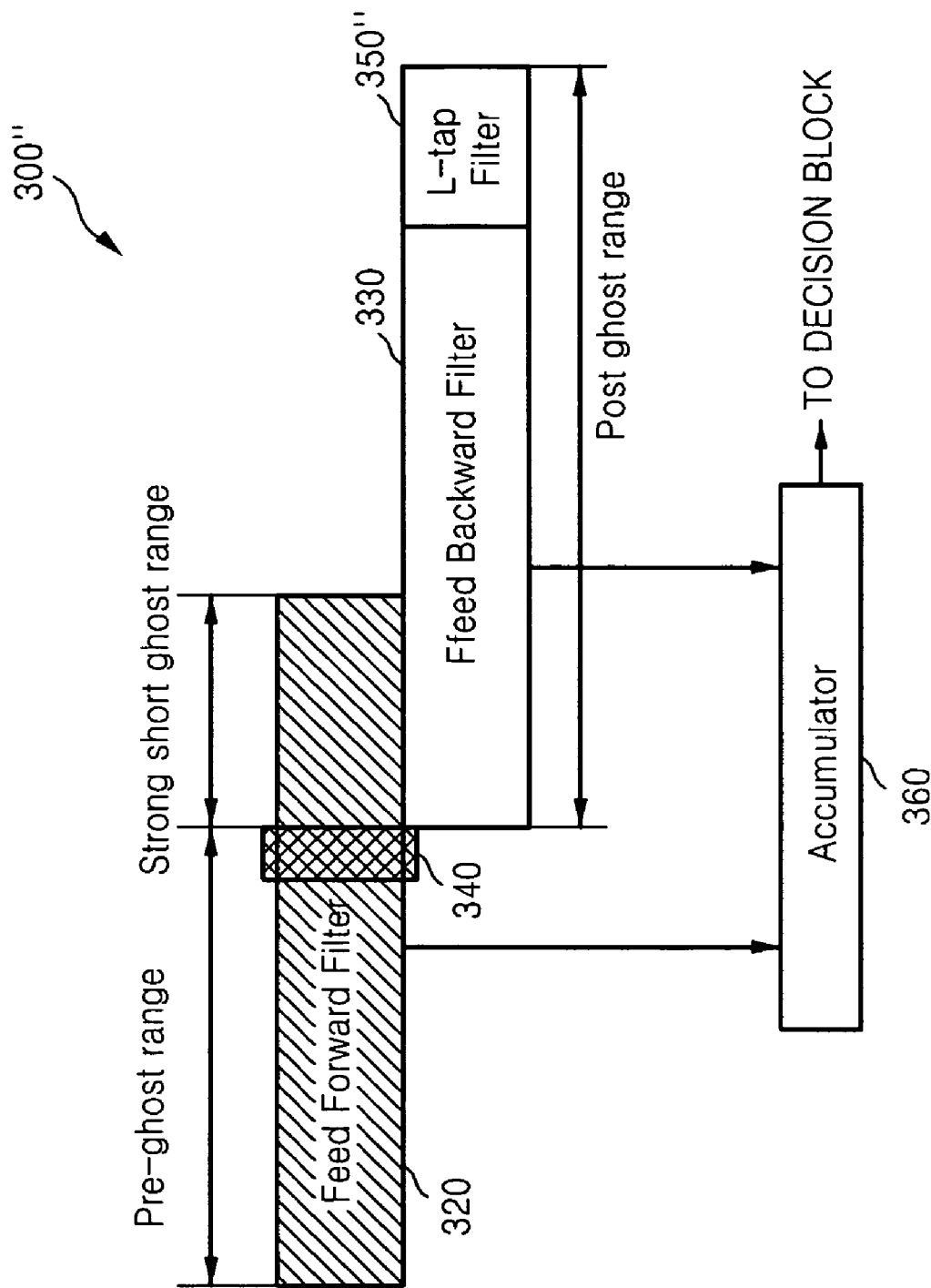
FIG. 3C is a schematic block diagram illustrating variable tap length equalizers for removing a long post-ghost signal according to some embodiments of the present invention.

Referring now to FIG. 3C, a schematic block diagram of the variable tap length equalizer 300" for removing a long post-ghost signal according to some embodiments of the present invention will be discussed. The variable tap length equalizer 300" includes the feed forward filter 320 including the main tap 340, the feed backward filter 330, the L-tap filter 350", and the accumulator 360. Each of the feed forward filter 320 and the feed backward filter 330 includes a plurality of taps. The functionality of like numbered elements of FIGS. 3A and 3C are similar and, therefore, the details will not be repeated herein. However, as illustrated in FIGS. 3A and 3C, the positioning of L-tap filter 350" of FIG. 3C is different from the L-tap filter 350 of FIG. 3A and, therefore, will be discussed.

When a long post-ghost signal exists in a channel, the variable tap length equalizer 300" connects the input port of the L-tap filter 350" to an output port of the feed backward filter 330 to increase the tap length of the feed backward filter 330, thus extending a long post-ghost signal handling range. In other words, the long post-ghost signal can be removed by the feed backward filter 330 and the L-tap filter 350" that are connected in series.

Figure 4:
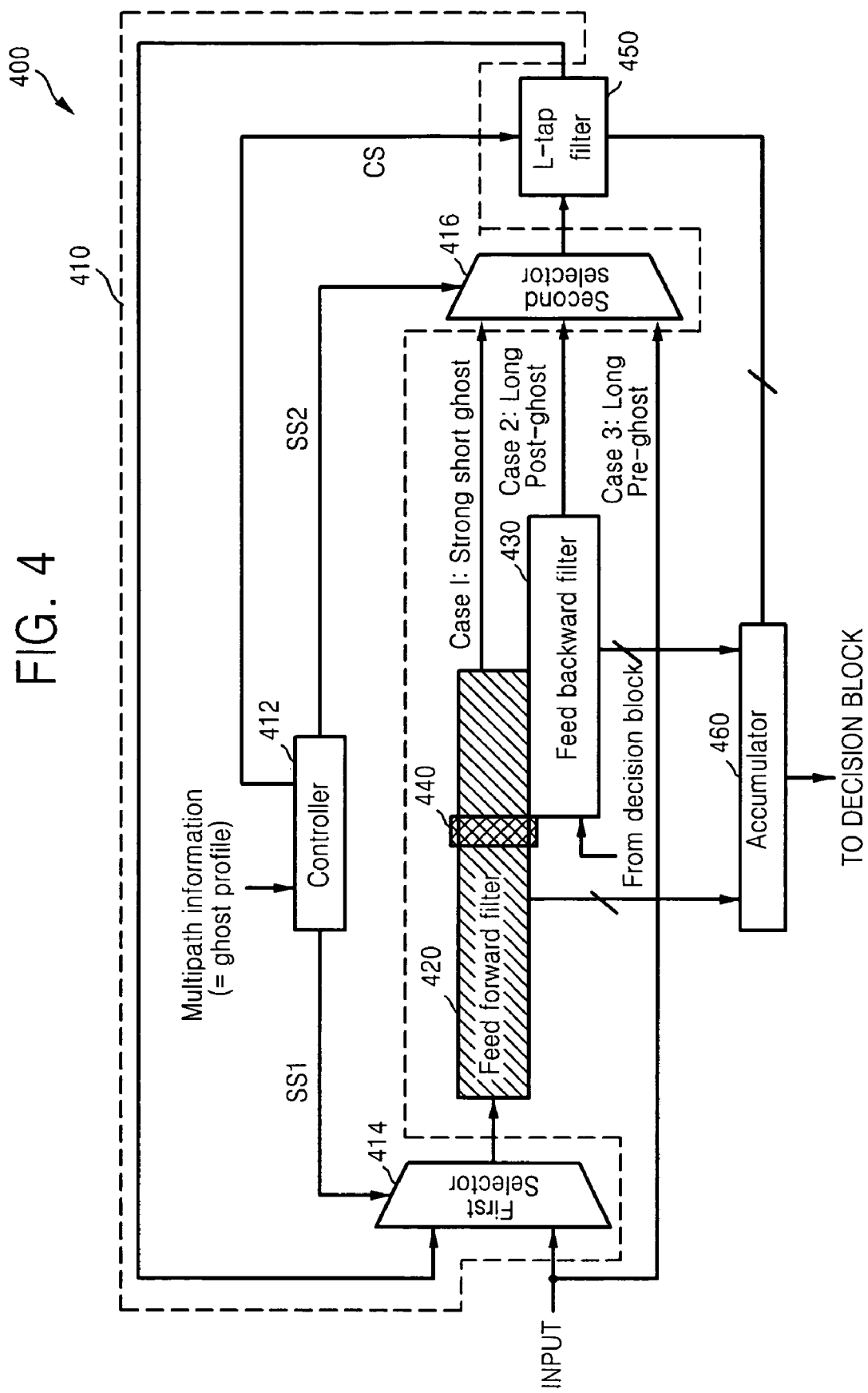
FIG. 4 is a block diagram illustrating a variable tap length equalizer according to some embodiments of the present invention.

Referring now to FIG. 4, a block diagram illustrating variable tap length equalizers according to some embodiments of the present invention will be discussed. As illustrated in FIG. 4, the variable tap length equalizer 400 includes a control unit 410, a feed forward filter 420 including a main tap 440, the feed backward filter 430, the L-tap filter 450, and the accumulator 460. The feed forward filter 420 includes N taps and the feed backward filter 430 includes M taps, where N, M, and L are natural numbers.

The control unit 410 connects the L-tap filter 450 to one of the feed forward filter 420 and the feed backward filter 430 according to multipath information (or a ghost signal profile), thus, possibly increasing the tap length of the feed forward filter 420 or the feed backward filter 430. As illustrated, the control unit 410 includes a controller 412, a first selector 414, and a second selector 416.

The controller 412 generates a first selection signal SS1, a second selection signal SS2, and a control signal CS. The first selector 414 selectively outputs one of an input signal INPUT and an output signal of the L-tap filter 450 to the feed forward filter 420 according to the first selection signal SS1 output from the controller 412.

In other words, when a long pre-ghost signal exists in a channel, the first selector 414 outputs an output signal of the L-tap filter 450 to the feed forward filter 420 according to the first selection signal SS1. In other cases, the first selector 414 outputs the input signal INPUT to the feed forward filter 420. In some embodiments of the present invention, the first selector 414 may be implemented by a multiplexer. It will be understood, however, that embodiments of the present invention are not limited to this configuration.

The second selector 416 outputs one signal(s) among output signal(s) of the feed forward filter 420, output signal(s) of the feed backward filter 430, and input signal(s) INPUT to the L-tap filter 450 according to the second selection signal SS2 output from the controller 412.

In other words, according to the second selection signal SS2 generated based on the multipath information, the second selector 416 outputs the input signal INPUT to the L-tap filter 450 when a long pre-ghost signal exists in a channel, outputs an output signal of the feed forward filter 420 to the L-tap filter 450 when a strong short ghost signal exists in a channel, and outputs an output signal of the feed backward filter 430 to the L-tap filter 450 when a long post-ghost signal exists in a channel. In some embodiments of the present invention, the second selector 416 may be a multiplexer. It will be understood, however, that embodiments of the present invention are not limited to this configuration.

The feed forward filter 420 receives an output signal of the first selector 414, removes a pre-ghost signal included in the output signal of the first selector 414 (or a pre-ghost signal included in the input signal INPUT) and outputs a pre-ghost removed signal.

The feed backward filter 430 receives a signal output from a decision block (not shown), removes a post-ghost signal included in the output signal of the decision block or a post-ghost signal included in the input signal INPUT, and outputs a post-ghost removed signal.

The L-tap filter 450 receives an output signal of the second selector 416, removes a ghost signal, for example, a long pre-ghost signal, a strong short ghost signal, or a long post-ghost signal, included in the output signal of the second selector 416 according to the control signal CS, and outputs a ghost removed signal to the feed forward filter 420 via the first selector 414 or to the accumulator 460.

In other words, the L-tap filter 450 removes one or more of a long pre-ghost signal included in the input signal INPUT, a strong short ghost signal behind the main tap 440, or a long post-ghost signal according to the output signal of the second selector 416 and the control signal CS.

In addition, the L-tap filter 450 adjusts a time delay of its output signal based on the control signal CS to synchronize its output signal with the output signal of the feed forward filter 420 and/or the output signal of the feed backward filter 430.

However, if any one of a long pre-ghost signal, a strong short ghost signal behind the main tap 440, and a long post-ghost signal does not exist, the L-tap filter 450 is turned off or resets the tap coefficients to an initial value, for example, "0" according to the control signal CS.

The accumulator 460 sums output signals of the feed forward filter 420, output signals of the feed backward filter 430, and output signals of the L-tap filter 450 at each clock signal and outputs a summation result to a predetermined block, for example, a decision block.

Methods of removing one or more of a long pre-ghost signal, a strong short ghost signal, and a long post-ghost signal using the variable tap length equalizer 300, 300', 300" and/or 400 according to some embodiments of the present invention based on multipath information (or a ghost signal profile) will be now be discussed with respect to FIGS. 3A through 4 below. It will be understood that like numerals in FIGS. 3A through 4 refer to like elements, accordingly, 320 corresponds to 420 and so on.

The controller 412 determines whether any one of a long pre-ghost signal, a strong short ghost signal, and a long post-ghost signal exists in a channel based on multipath information. In a first scenario, it may be determined that a long pre-ghost signal exists in the channel, the second selector 416 outputs the input signal INPUT among an output signal of the feed forward filter 420, an output signal of the feed backward filter 430, and the input signal INPUT to the L-tap filter 450 in response to the second selection signal SS2 output from the controller 412.

The first selector 414 selectively outputs an output signal(s) of the L-tap filter 450 among the input signal(s) INPUT and the output signal(s) of the L-tap filter 450 to the feed forward filter 420 in response to the first selection signal SS1 output from the controller 412.

In other words, an output port of the L-tap filter 450 is connected to an input port of the feed forward filter 420 in series. Accordingly, the number of taps of the feed forward filter 420 may increase by the number of taps of the L-tap filter 450. Here, the input port is a port that receives at least one signal and the output port is a port that outputs at least one signal.

The input signal INPUT including the long pre-ghost signal is input to the L-tap filter 450 via the second selector 316.

The L-tap filter 450 receives the input signal INPUT, removes the long pre-ghost signal included in the input signal INPUT, and outputs the long pre-ghost removed input signal INPUT to the accumulator 460 and the first selector 414.

The accumulator 460 sums output signals of the feed forward filter 420, output signals of the feed backward filter 430, and output signals of the L-tap filter 450 and outputs signals corresponding to a summation result to a predetermined block, for example, a decision block.

The signal output from the L-tap filter 450 is input to the feed forward filter 420 via the first selector 414. The feed forward filter 420 removes a long pre-ghost signal and/or a pre-ghost signal from the output signal of the L-tap filter 450 and outputs a pre-ghost removed signal to the accumulator 460.

As a result, the long pre-ghost signal and/or the pre-ghost signal included in the channel may be removed by the L-tap filter 450 and the feed forward filter 420 which are connected in series. Here, the accumulator 460 sums output signals of the feed forward filter 420, output signals of the feed backward filter 430, and output signals of the L-tap filter 450 and outputs signals corresponding to summation results to the decision block.

A signal output from the decision block is input to the feed backward filter 430. The feed backward filter 430 removes a post-ghost signal from the input signal INPUT output from the decision block and outputs the post-ghost removed input signal INPUT to the accumulator 460. Then, the accumulator 460 sums output signals of the feed forward filter 420, output signals of the feed backward filter 430, and output signals of the L-tap filter 450 and outputs signals corresponding to summation results to the decision block (not shown).

In a second scenario, it may be determined that a strong short ghost signal exists in the channel, the first selector 414 selectively outputs the input signal INPUT among the input signal INPUT and an output signal of the L-tap filter 450 to the feed forward filter 420 in response to the first selection signal SS1 output from the controller 412.

The second selector 416 outputs output signals of the feed forward filter 420 among output signals of the feed forward filter 420, output signals of the feed backward filter 430, and input signals INPUT to the L-tap filter 450 in response to the second selection signal SS2 output from the controller 412.

An input port of the L-tap filter 450 is connected to an output port of the feed forward filter 420 in series. Accordingly, the number of taps used to remove the strong short ghost signal in the feed forward filter 420 may increase by the number of taps of the L-tap filter 450.

The input signal INPUT is input to the feed forward filter 420 via the first selector 414. The feed forward filter 420 receives the input signal INPUT, removes a pre-ghost signal from the input signal INPUT, and outputs a pre-ghost removed signal to the accumulator 460 and to the second selector 416. The accumulator 460 sums output signals of the feed forward filter 420, output signals of the feed backward filter 430, and output signals of the L-tap filter 450 and outputs summation results to the decision block (not shown).

The output signal of the feed forward filter 420 is input to the L-tap filter 450 via the second selector 416. The L-tap filter 450 receives the output signals of the feed forward filter 420, removes the strong short ghost signals from the output signals of the feed forward filter 420, and outputs strong short ghost removed signals to the accumulator 460.

As a result, the strong short ghost signals included in the channel may be removed by the L-tap filter 450 and the feed forward filter 420 which are connected in series. The accumulator 460 sums output signals of the feed forward filter 420, output signals of the feed backward filter 430, and output signals of the L-tap filter 450 and outputs summation results to the decision block (not shown).

The signals output from the decision block are input to the feed backward filter 330. The feed backward filter 430 removes post-ghost signals from the output signals of the decision block and outputs post-ghost removed signals to the accumulator 460.

The accumulator 460 sums output signals of the feed forward filter 420, output signals of the feed backward filter 430, and output signals of the L-tap filter 450 and outputs summation results to the decision block.

In a third scenario, it may be determined that the long post-ghost signal exists in the channel, the first selector 414 outputs the input signal INPUT among the input signal INPUT and an output signal of the L-tap filter 450 to the feed forward filter 420 in response to the first selection signal SS1 output from the controller 412.

The second selector 416 outputs output signals of the feed forward filter 420 among output signals of the feed forward filter 420, output signals of the feed backward filter 430, and input signals INPUT to the L-tap filter 450 in response to the second selection signal SS2 output from the controller 412.

The input port of the L-tap filter 450 is connected to an output port of the feed backward filter 430 in series. Accordingly, the number of taps used to remove the long post-ghost signal in the feed backward filter 430 increases by the number of taps of the L-tap filter 450.

Operations of variable tap length equalizers 300, 300', 300" and 400 according to some embodiments of the present invention will now be discussed based on the path of the input signal INPUT below. The input signal INPUT is input to the feed forward filter 420 via the first selector 414. The feed forward filter 420 receives the input signal INPUT, removes a pre-ghost signal from the input signal INPUT, and outputs the pre-ghost removed input signal INPUT to the accumulator 460. The accumulator 460 sums the output signals of the feed forward filter 420, output signals of the feed backward filter 430, and output signals of the L-tap filter 450 and outputs summation results to the decision block (not shown).

The output signals of the decision block are input to the feed backward filter 430. The feed backward filter 430 receives the output signals of the decision block, removes post-ghost signals from the output signals of the decision block, and outputs post-ghost removed signals to the accumulator 460.

The accumulator 460 sums an output signal of the feed forward filter 420, an output signal of the feed backward filter 430, and an output signal of the L-tap filter 450 and outputs a summation result to the decision block. The output signal of the feed backward filter 430 is input to the L-tap filter 450 via the second selector 416.

The L-tap filter 450 receives the output signal of the feed backward filter 430, removes a long post-ghost signal from the output signal of the feed backward filter 430, and outputs a long post-ghost removed signal to the accumulator 460. As a result, the post-ghost signal and/or the long post-ghost signal included in the channel may be removed by the L-tap filter 450 and the feed backward filter 430 which are connected in series.

The accumulator 460 sums an output signal of the feed forward filter 420, an output signal of the feed backward filter 430, and an output signal of the L-tap filter 450 and outputs a summation result to the decision block.

As discussed above, based on multipath information (or a ghost signal profile), variable tap length equalizers according to some embodiments of the present invention connect the output port of the L-tap filter 450 to the input port of the feed forward filter 420 to remove a long pre-ghost signal and/or a pre-ghost signal, connects the input port of the L-tap filter 450 to the output port of the feed backward filter 430 to remove a long post-ghost signal and/or a post-ghost signal, or connects the input port of the L-tap filter 450 to the output port of the feed forward filter 420 to remove a strong short ghost signal. Accordingly, variable tap length equalizers according to some embodiments of the present invention may effectively remove a long pre-ghost signal, a strong short ghost signal, and a long post-ghost signal based on a ghost signal profile of a channel.

Figure 5:
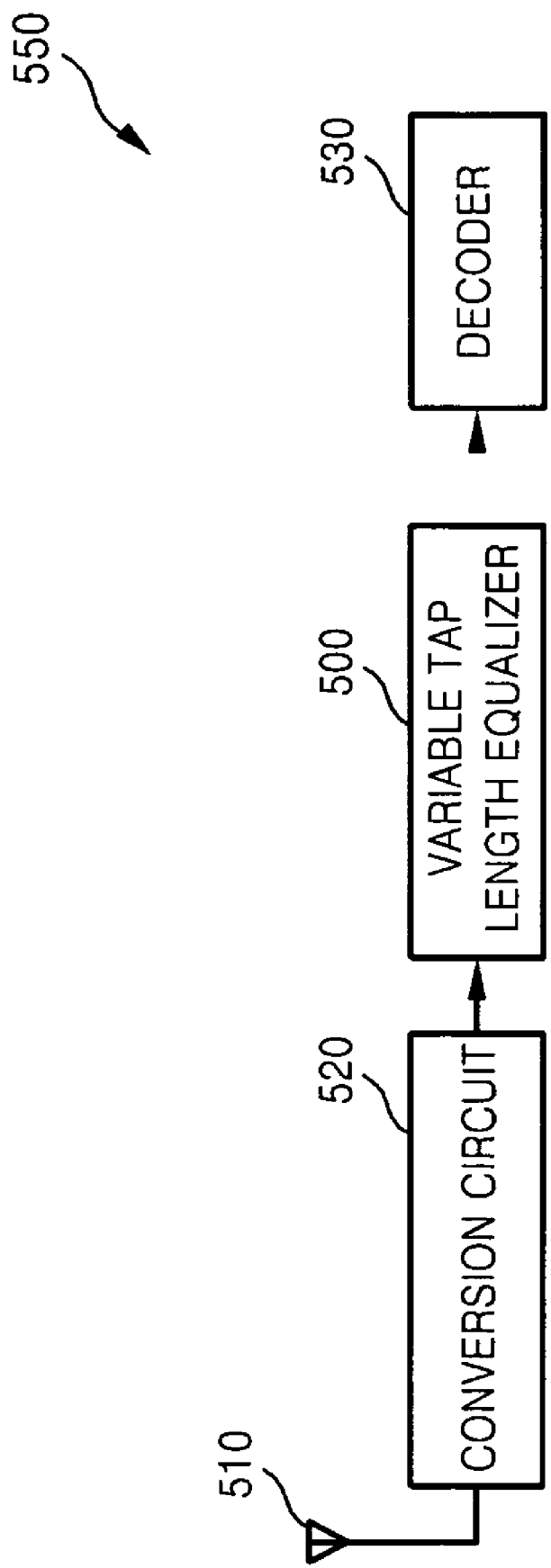
FIG. 5 is a block diagram illustrating a digital receiver including the variable tap length equalizer according some embodiments of the present invention.

Referring now to FIG. 5, a functional block diagram illustrating a digital receiver 550 including the variable tap length equalizer according some embodiments of the present invention will be discussed. As illustrated in FIG. 5, the digital receiver 550 includes an antenna 510, a conversion circuit 520, the variable tap length equalizer 500, and a decoder 530.

The antenna 510 receives a radio frequency signal transmitted from a transmitter. The conversion circuit 520 converts the radio frequency signal into a base-band signal through filtering based on an intermediate frequency and outputs the base-band signal to the variable tap length equalizer 500.

The variable tap length equalizer 500 receives the base-band signal, equalizes the base-band signal to compensate for any multipath loss, and transmits the equalized base-band signal to the decoder 530 via a decision block. The digital receiver 500 may be used for a television receiver, a cellular phone, a cable receiver, and the like without departing from the scope of the present invention.

FIG. 6 is a flowchart illustrating steps for removing various ghost signals using the variable tap length equalizers according to some embodiments of the present invention. Methods will now be discussed with respect to FIGS. 3A through 6.

Operations begin at block on 600 by analyzing the multipath information (ghost profile). In some embodiments of the present invention, the controller 412 may be configured to determine whether any one of a long pre-ghost signal, a strong short ghost signal, and a long post-ghost signal exists in a channel based on multipath information (or a ghost signal profile) and generate a first selection signal SS1, a second selection signal SS2, and a control signal CS.

It is determined whether the long pre-ghost exists in the channel (block 610). If it is determined that the long pre-ghost signal exists in the channel (block 610), an output port of L-tap filter is connected to an input port of N-tap feed forward filter (block 620). In some embodiments of the present invention, the second selector 416 outputs the input signal INPUT to the input port of the L-tap filter 450 in response to the second selection signal SS2 and the first selector 414 outputs an output signal of the L-tap filter 450 to the feed forward filter 420 having N taps (referred to as an N-tap feed forward filter 420) in response to the first selection signal SS1.

Accordingly, the output port of the L-tap filter 450 is connected to the input port of the feed forward filter 420 in series so that the tap length of the feed forward filter 420 for removing a pre-ghost signal increases due to the L-tap filter 450. As a result, long pre-ghost signals and/or pre-ghost signals existing in the channel may be removed using the L-tap filter 450 according to some embodiments of the present invention.

If it is determined that a long pre-ghost does not exist in the channel (block 610), it is determined if a strong short ghost exists in a short section behind the main tap (block 630). If it is determined that the strong short ghost signal exists in the channel (block 630), an input port of an L-Tap filter is connected to an output port of N-tap feed forward filter (block 640). In some embodiments of the present invention, the first selector 414 outputs the input signal INPUT to the feed forward filter 420 and the second selector 416 outputs an output signal of the feed forward filter 420 to the L-tap filter 450. Accordingly, the input port of the L-tap filter 450 is connected to the output port of the feed forward filter 420 in series so that the tap length of the feed forward filter 420 for removing a strong short ghost signal increases due to the L-tap filter 450. As a result, the strong short ghost signal existing in the channel may be removed using the L-tap filter 450 according to some embodiments of the present invention.

If it is determined that a strong short ghost does not exist in the channel (block 630), it is determined if a long post-ghost exists in the channel (block 650). If it is determined that the long post-ghost signal exists in the channel (block 650), the input port of the L-tap filter is connected to the output port of the M-tap feed backward filter (block 660). In some embodiments of the present invention, the first selector 414 outputs the input signal INPUT to the feed forward filter 420 in response to the first selection signal SS1 and the second selector 416 outputs an output signal of the feed backward filter 430 having M taps (referred to as an M-tap feed forward filter 430) to the L-tap filter 450 in response to the second selection signal SS2.

Accordingly, the input port of the L-tap filter 450 is connected to the output port of the feed backward filter 430 in series so that the tap length of the feed backward filter 430 for removing a post-ghost signal increases due to the L-tap filter 450. As a result, long post-ghost signals and/or post-ghost signal existing in the channel may be removed using the L-tap filter 450 according to some embodiments of the present invention.

Methods of removing various ghost signals according to some embodiments of the present invention may be implemented using an equalizer and also be embodied as a predetermined program, which can be recorded in a predetermined recording medium.

As discussed briefly above, according to some embodiments of the present invention an L-tap filter can be connected to one of an N-tap feed forward filter and an M-tap feed backward filter according to a type of ghost signal that exists in a channel and the ghost signal can be removed. Furthermore, some embodiments of the present invention may increase a handling range of ghost signals with respect to a hardware size, thereby increasing hardware efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

That which is claimed is:

1. An equalizer comprising: an N-tap feed forward filter; an M-tap feed backward filter; an L-tap filter; a control unit configured to connect the L-tap filter to the N-tap feed forward filter or the M-tap feed backward filter based on multipath information present in a communications channel; and an accumulator configured to sum output signals from at least one of the N-tap feed forward filter, the M-tap feed backward filter and the L-tap filter and to output a summation result; wherein the control unit is further configured to connect the output port of the L-tap filter to the input port of the N-tap feed forward filter when the multipath information is a long pre-ghost signal, connect the input port of the L-tap filter to the output port of the N-tap feed forward filter when the multipath information is a strong short ghost signal, or connect the input port of the L-tap filter to the output port of the M-tap feed backward filter when the multipath information is a long post-ghost signal.

2. The equalizer of claim 1, wherein the control unit is configured to connect an output port of the L-tap filter to an input port of the N-tap feed forward filter, connect an input port of the L-tap filter to an output port of the N-tap feed forward filter, or connect the input port of the L-tap filter to an output port of the M-tap feed backward filter based on the multipath information present in the communications channel.

3. The equalizer of claim 1, wherein the control unit comprises:
a controller configured to generate a first selection signal, a second selection signal, and a control signal based on the multipath information present in the communications channel;
a first selector configured to selectively output an input signal or an output signal of the L-tap filter to the N-tap feed forward filter responsive to the first selection signal; and
a second selector configured to selectively output the input signal, an output signal of the N-tap feed forward filter or an output signal of the M-tap feed backward filter to the L-tap filter responsive to the second selection signal.

4. The equalizer of claim 1, wherein the control signal is used to turn on or off the L-tap filter, to reset the L-tap filter, or to synchronize the output signal of the L-tap filter with the output signal of the N-tap feed forward filter and the output signal of the M-tap feed backward filter.

5. A digital receiver comprising: a conversion circuit configured to convert a signal received through an antenna into a base-band signal and output the base-band signal; an equalizer configured to receive the base-band signal, equalize the base-band signal to compensate for multipath loss, and output an equalized base-band signal; and a decoder configured to receive the equalized base-band signal, decode the received base-band signal, and output a decoded signal to a signal processor, wherein the equalizer comprises: an N-tap feed forward filter; an M-tap feed backward filter; an L-tap filter; a control unit configured to connect the L-tap filter to the N-tap feed forward filter or the M-tap feed backward filter based on multipath information; and an accumulator configured to sum output signals from at least two of the N-tap feed forward filter, the M-tap feed backward filter, and the L-tap filter and output a summation result; wherein the control unit is further configured to connect the output port of the L-tap filter to the input port of the N-tap feed forward filter when the multipath information is a long pre-ghost signal, connect the input port of the L-tap filter to the output port of the N-tap feed forward filter when the multipath information is a strong short ghost signal, or connect the input port of the L-tap filter to an output port of the M-tap feed backward filter when the multipath information is a long post-ghost signal.

6. The digital receiver of claim 5, wherein the control unit is configured to connect an output port of the L-tap filter to an input port of the N-tap feed forward filter, connect an input port of the L-tap filter to an output port of the N-tap feed forward filter, or connect the input port of the L-tap filter to an output port of the M-tap feed backward filter based on the multipath information.

7. The digital receiver of claim 5, wherein the control unit comprises:
a controller configured to generate a first selection signal, a second selection signal, and a control signal based on the multipath information;

a first selector configured to selectively output an input signal or an output signal of the L-tap filter to the N-tap feed forward filter responsive to the first selection signal; and a second selector configured to selectively output the input signal, an output signal of the N-tap feed forward filter or an output signal of the M-tap feed backward filter to the L-tap filter responsive to the second selection signal.

8. The digital receiver of claim 7, wherein the control signal is used to turn on or off the L-tap filter, to reset the L-tap filter, or to synchronize the output signal of the L-tap filter with the output signal of the N-tap feed forward filter and the output signal of the M-tap feed backward filter.

9. A method of removing ghost signals using an equalizer including an N-tap feed forward filter, an M-tap feed backward filter, and an L-tap filter, the method comprising: receiving multipath information; and connecting an output port of the L-tap filter to an input port of the N-tap feed forward filter, connecting an input port of the L-tap filter to an output port of the N-tap feed forward filter, or connecting the input port of the L-tap filter to an output port of the M-tap feed backward filter based on the multipath information; further comprising: connecting the output port of the L-tap filter to the input port of the N-tap feed forward filter when the multipath information is a long pre-ghost signal; connecting the input port of the L-tap filter to the output port of the N-tap feed forward filter when the multipath information is a strong short ghost signal; or connecting the input port of the L-tap filter to an output port of the M-tap feed backward filter when the multipath information is a long post-ghost signal.

10. A computer program product for removing ghost signals using an equalizer including an N-tap feed forward filter, an M-tap feed backward filter, and an L-tap filter, the computer program product comprising: computer readable storage medium having computer readable program code embodied in said medium, the computer readable program code comprising: computer readable program code configured to receive multipath information; and computer readable program code configured to connect an output port of the L-tap filter to an input port of the N-tap feed forward filter, connect an input port of the L-tap filter to an output port of the N-tap feed forward filter, or connect the input port of the L-tap filter to an output port of the M-tap feed backward filter based on the multipath information; further comprising: computer readable program code configured to connect the output port of the L-tap filter to the input port of the N-tap feed forward filter when the multipath information is a long pre-ghost signal; computer readable program code configured to connect the input port of the L-tap filter to the output port of the N-tap feed forward filter when the multipath information is a strong short ghost signal; or computer readable program code configured to connect the input port of the L-tap filter to an output port of the M-tap feed backward filter when the multipath information is a long post-ghost signal.

* * * * *